(12) United States Patent
Limcaco (10) Patent No.: US 11,702,353 B2
(45) Date of Patent: Jul. 18, 2023

(54) FLOATING WATER TREATMENT APPARATUS (71) Applicant: Christopher A. Limcaco, Greenwood, IN (US)

(72) Inventor: Christopher A. Limcaco, Greenwood, IN (US)

(*) Notice: Subject to any disclaimer, the term of this patent is extended or adjusted under 35 U.S.C. 154(b) by 140 days.

(21) Appl. No.: 17/387,471

(22) Filed: Jul. 28, 2021

(65) Prior Publication Data
US 2022/0227646 A1 Jul. 21, 2022

Related U.S. Application Data (60) Provisional application No. 63/138,825, filed on Jan. 19, 2021.

(51) Int. Cl.
C02F 3/08 (2023.01)
C02F 3/32 (2023.01)

(52) U.S. Cl.
CPC ............ C02F 3/082 (2013.01); C02F 3/325 (2013.01)

(58) Field of Classification Search
CPC .............................. C02F 3/082; C02F 3/325
USPC ......................... 210/602, 619, 150
See application file for complete search history.

(56) References Cited

U.S. PATENT DOCUMENTS

| | | | | |
|---|---|---|---|---|
| 3,598,726 A * | 8/1971 | Welch | ............. | C02F 3/32 210/603 |
| 4,330,408 A * | 5/1982 | McClure | ............. | C02F 3/082 261/92 |
| 4,540,491 A * | 9/1985 | Zimmer | ............. | C02F 3/082 261/92 |
| 6,039,873 A * | 3/2000 | Stahler | ............. | C02F 3/006 210/906 |
| 2006/0113241 A1* | 6/2006 | Bolton | ............. | B01D 35/05 210/150 |
| 2009/0230040 A1* | 9/2009 | Limcaco | ............. | C10L 3/08 210/150 |

FOREIGN PATENT DOCUMENTS

EP 3907195 A1 * 11/2021

* cited by examiner

Primary Examiner — Fred Prince
(74) Attorney, Agent, or Firm — Maginot, Moore & Beck LLP (57) ABSTRACT A rotating biological contactor (RBC) is provided that includes a media wheel with a plurality of vanes configured for growth of algae thereon. The media wheel is configured for rotation by air directed from an air diffuser to impinge on the vanes such that when said media wheel is partly immersed in water rotation of the media wheel alternately exposes algae growing on the plurality of vanes to sunlight and to the water. A frame is connected to an axle of the media wheel. Only one of the media wheel and the frame is constructed with a buoyancy sufficient to support the media wheel partly immersed in water during rotation of the media wheel.

18 Claims, 8 Drawing Sheets

FLOATING WATER TREATMENT APPARATUS

PRIORITY CLAIM

This application is a utility filing from and claims priority to U.S. Provisional Application No. 63/138,825, filed on Jan. 19, 2021, the entire disclosure of which is incorporated herein by reference.

BACKGROUND

The present disclosure relates to wastewater treatment systems and processes, and particularly to ecological and biological treatment systems. More specifically, the disclosure concerns systems and methods for treating wastewater and for using the byproducts of such treatment, particularly as a "green" or renewable energy source.

U.S. Pat. No. 7,776,211 (the '211 Patent), the entire disclosure of which is incorporated herein by reference, discloses a wastewater treatment system that incorporates a rotating biological contactor (RBC), such as the RBC apparatus 30 shown in FIG. 1. The RBC apparatus 30 utilizes algae and bacteria to advantageously biologically treat the wastewater, employing technology described in U.S. Pat. Nos. 5,647,983, 5,755,961, and 6,158,386, the disclosures of which are all incorporated herein by reference. The RBC apparatus 30 includes a media wheel 40 that is supported within a tank 32 for rotation about a central axis defined by an axle 41. It is understood that the wheel can rotate about the axle or that the wheel can be fixed to the axle with the axle rotating about a support. The media wheel 40 includes air capture members, or vanes, 43 that are used to rotate the wheel within the wastewater contained in the tank. In particular, a jet or flow of air is provided by an external air pump and directed through an air inlet 35 to impinge on the vanes 43 to rotate the wheel. The vanes are preferably configured to, in effect, capture an air pocket between successive vanes so that the relative buoyancy of the air pocket will rotate the wheel as the air pocket rises within the tank.

Figure 1:
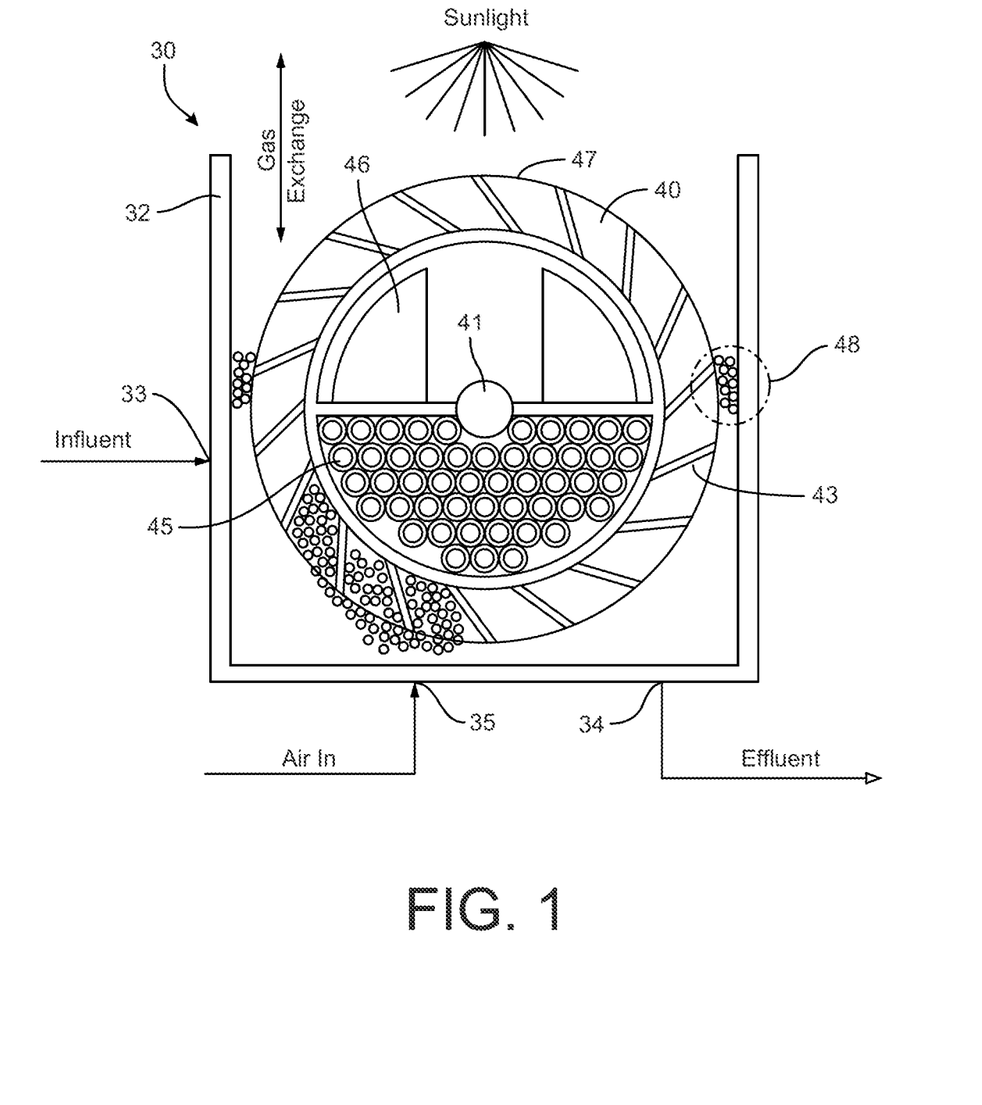
FIG. 1 is a side view of a rotating biological contactor (RBC) apparatus used in embodiments of the present disclosure.

In the illustrated embodiment, the media wheel 40 includes a biological filter media 45 contained in one portion of the wheel that is configured to support bacterial growth. Treatment of the wastewater requires bringing the nutrients within the wastewater into contact with bacterial colonies that use the nutrients as food. The wastewater level within the tank 32 is maintained so that the filter media 45 will be alternately submerged in and lifted out of the wastewater, which beneficially enhances the transfer of oxygen and $CO_2$ between the bacterial colony and the wastewater. While one portion or half of the wheel interior is filled with the biological filter media 45, the remaining portion or half 46 is empty. Thus, as the media wheel 40 rotates, the filter media 45 alternately displaces the wastewater, producing a continuous movement or surge of the wastewater within the tank 32. This continuous movement increases the nutrient removal rate or capability of algae that grows on the vanes of the wheel 40 and that is suspended within tank 32. The media wheel is configured to support algae growth, such as by the provision of multiple vanes 43 to provide significant surface area on which the algae may grow.

The air jet at the inlet 35 is beneficial for the growth of the algae because the air jet foams and fractionates the wastewater. This foam 48 collects at the surface of the water between the media wheel 40 and the walls of the container. This foam bears against the wheel and more particularly the algae growing thereon so that the algae can readily extract the necessary nutrients from the entrained bio-solids within the foam. It can be appreciated that the algae growing on the wheel forms a biomass that can be used for bio-diesel, fertilizer and other "green" uses. The RBC apparatus 30 thus contemplates that the algae will be continuously dislodged from the wheel and allowed to pass into a tertiary treatment tank. The air jet through inlet 35 can dislodge algae from the wheel once the algae colony reaches a critical mass. Once removed from the wheel, the algae biomass exits tank 32 through outlet 34 which can communicate with a further treatment tank.

Figure 2:
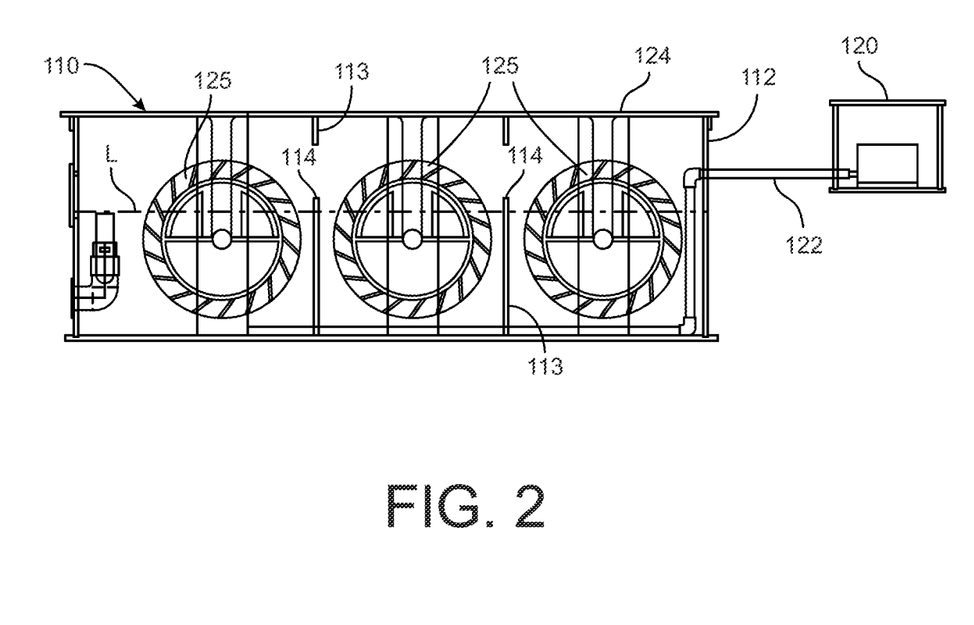
FIG. 2 is a side view of a wastewater treatment system using the RBC apparatus shown in FIG. 1.

One embodiment of the wastewater treatment system 110 of the '211 Patent is shown in FIG. 2. The system 110 includes a tank 112 that contains multiple media wheels 125 arranged in a series of rows and columns within the tank. Walls 113 separate each media wheel 125 with a weir 114 defined in each wall to establish a common water level within the tank. Wastewater flows through the tank 112 at a water level L that is controlled to maintain an optimum height within the container. In order to maintain optimum conditions for algae growth, it is desirable to control the amount of exposure of the algal colonies to the sunlight as the media wheels 125 rotate. If the water level L is too low, a greater portion of the circumference of the wheels is exposed to sunlight, and conversely if the water level is too high. In either case, too much or too little sunlight can compromise the desired conditions for optimum algae growth. Too little algae reduces the treatment capability of the system and reduces the biosolids produced by the system. The level control 117 may be a conventional float valve positioned at the opening of the outlet 116 within the container 112. Since sunlight is critical to the function of the system 110, the container 112 is provided with a translucent or transparent lid 124 that keeps debris and wildlife from interfering with the operation of the system 110. The system 110 includes an air pump 121 that feed air to the media wheels through corresponding air tubes 122.

Figure 3:
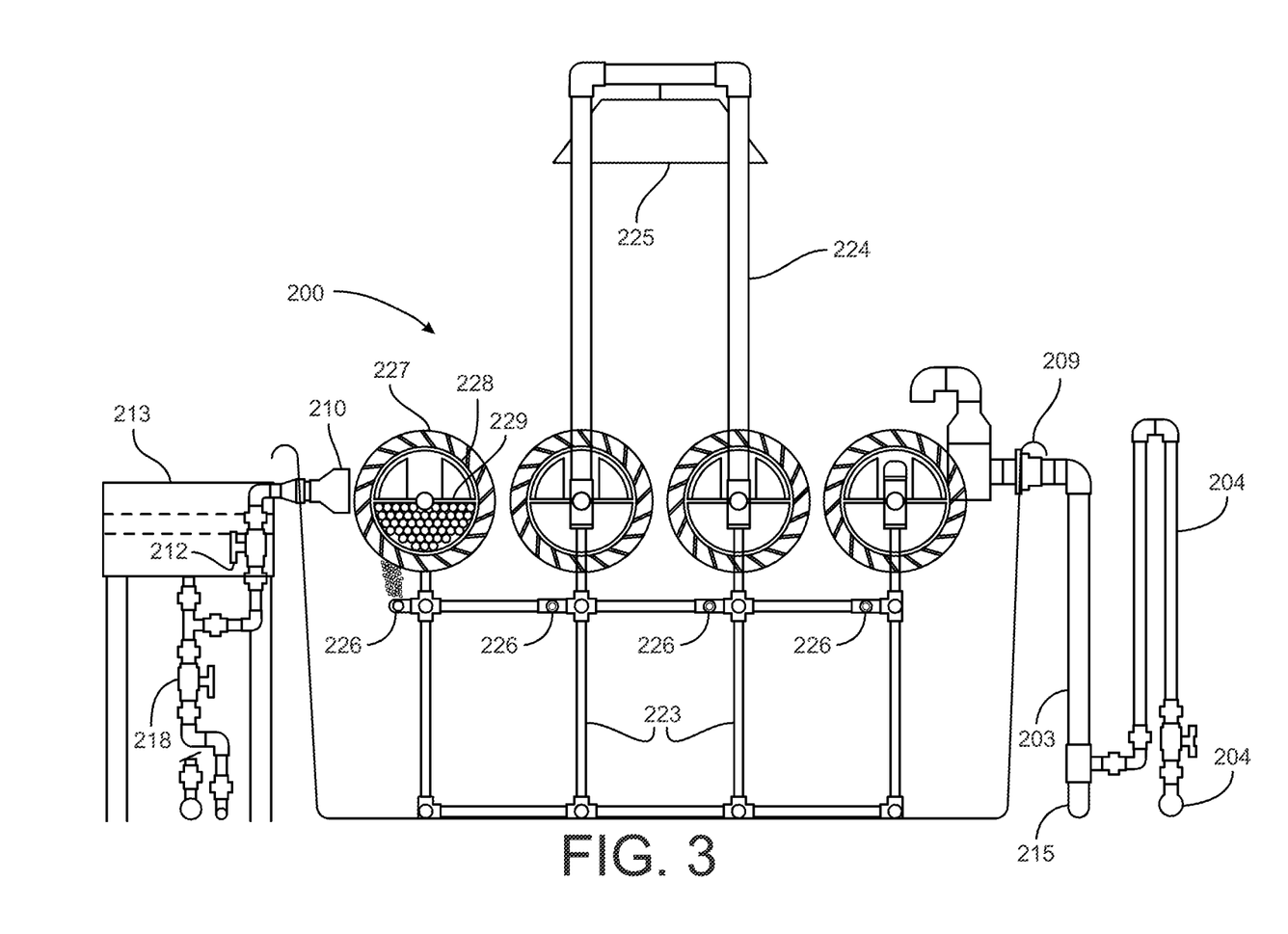
FIG. 3 is a side view of an aquaculture system using the RBC apparatus shown in FIG. 1.

The rotating biological contactor technology shown in FIG. 1, is implemented in a recirculating aquaculture system (RAS) disclosed in U.S. Pat. No. 9,380,766, the entire disclosure of which is incorporated herein by reference. Thus, as shown in FIG. 3, a system 200 includes several media wheels 227, with the vanes 228 and biological media 229 similar to the RBC apparatus 30, disposed in a tank 209. A plurality of air diffusers 226 are disposed in the tank beneath the media wheels to direct air to the vanes 228 as described above. In this application of the media wheel technology, a surge pump 203, fed by an air supply line 204, forces an air and water mixture into the tank 209. Water exits the tank at outlet 210 and is fed through a valve 212 to a clarifier 213, from which solids are drained at valve 218. A light 225 is supported by a frame 224 above the media wheels 226 to provide a light source for the tanks. It is contemplated that the tank houses fish and/or other aquatic creatures, so the media wheels 227 are necessary to process the biological waste of the creatures. The algae generated by the RAS not only helps process the waste but also adds to the oxygen level in the tank, which reduces the volume of air that must be supplied by the surge pump.

In the systems described above, the RBC apparatus is supported within a tank by a fixed support frame. This arrangement requires custom tanks and support frames be constructed to maintain proper water levels for the RBC apparatus to operate. Lagoon type wastewater treatment plants cannot meet the current treatment levels required by regulatory agencies. Therefore, many of them are being replaced by advanced mechanical plants that incorporate the fixed RBC apparatus at great expense to the wastewater utility. In most cases, multiple RBC apparatuses are required, each of which are mounted within the tank by a fixed support. For instance, a municipal wastewater treatment facility may include dozens, and even hundreds, RBC apparatuses, all requiring a fixed support within a custom tank.

SUMMARY OF THE DISCLOSURE

A rotating biological contactor (RBC) includes a media wheel having a plurality of vanes configured for growth of algae thereon. The plurality of vanes are oriented and configured to cause the media wheel to rotate when air impinges on the vanes such that when the media wheel is partly immersed in water, rotation of the media wheel alternately exposes algae growing on the plurality of vanes to sunlight and to the water. In certain embodiments, the RBC includes a frame connected to an axle of the media wheel, whereby the media wheel rotates about a central axis relative to the frame. An air diffuser connected to a source of air is provided and is arranged in an operating position to direct air to impinge on the plurality of vanes when the media wheel is partly immersed in water. In one feature of the disclosure, one of the media wheel and the frame is constructed with a buoyancy sufficient to support the media wheel partly immersed in water during rotation of the media wheel.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

In one aspect of the present disclosure, an independent floating support frame carries an RBC (rotating biological contactor) apparatus, such as the apparatus 30, so that the apparatus is always maintained at an optimum operating water level, whether within a tank or in a body of water, such as a retention pond. This feature allows a plurality of RBC apparatuses to be installed without the need for specialized frames or tank constructions, and allows the RBC apparatuses to be installed in a free body of water that does not have any structure, such as a tank wall, to support a fixed support frame. In another aspect, the RBC is sufficiently buoyant to support itself at an optimum operating water level.

Figure 4A:
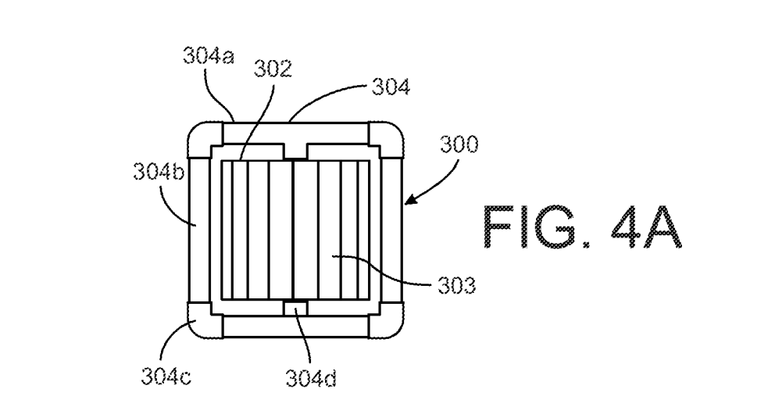
FIGS. 4A-C are top, side and end views of a floating RBC apparatus according to one embodiment of the present disclosure with one embodiment of an air diffuser.
Figure 4B:
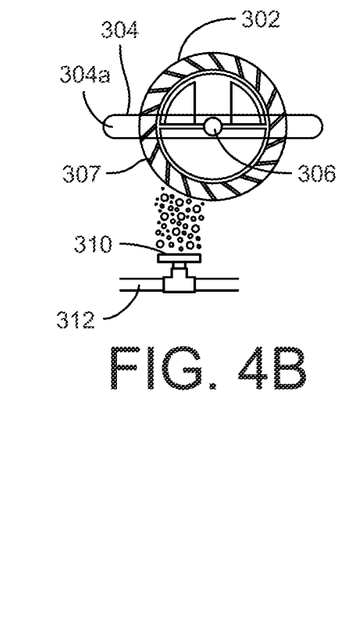
Figure 4C:
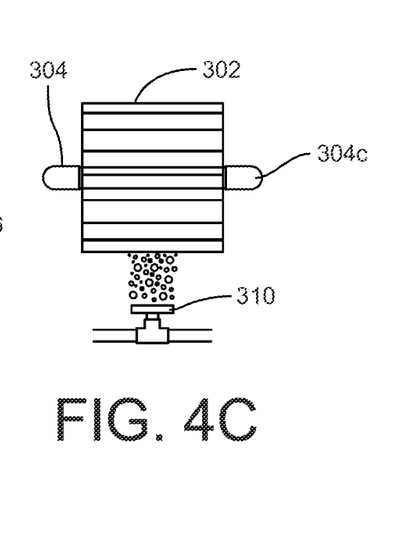

Thus, in one embodiment, the floating assembly 300 shown in FIGS. 4A-C includes a frame structure 304 configured to support an RBC apparatus 302, which can be configured like the apparatus 30 described above. The, RBC apparatus 302 can particularly include a wheel 303, like the wheel 40, constructed as described in U.S. Pat. Nos. 5,647, 983, 5,755,961, and 6,158,386, the disclosures of which are all incorporated herein by reference. The frame structure 304 can be formed from elongated members 304a and 304b joined at joint elements 304c to form a generally rectangular frame. The frame structure can be formed of any buoyant material, preferably a plastic material such as ABS, polycarbonate, PVC and nylon. The elongated members are preferably circular in cross-section, but other cross-sectional shapes are contemplated. The frame structure 304 is preferably rectangular, as depicted in FIGS. 4A-C, although other configurations are contemplated. The elongated members 304a, 304b are preferably sized to be slightly larger than the profile of the RBC apparatus 302, while providing sufficient clearance between the apparatus and the frame so as to not interfere with the operation of the RBC apparatus. The elongated members are preferably hollow but sealed to capture air inside the frame structure to ensure the buoyancy of the assembly 300. The hollow interior can be filed with a further buoyant material, such as a foam, to enhance the ability of the assembly 300 to float. It is understood that the frame structure 304 need not float directly on the surface of the water, but can be slightly submerged, provided the media wheel is supported so that rotation of the wheel can alternatively expose the algae growing on the vanes to sunlight and to the water.

The wheel 303 of the RBC apparatus 302 includes an axle 306 that defines a central axis about which the vanes 307 rotate. Thus, as described above, the wheel 303 can rotate about the axle 306, or the wheel can be fixed to the axle with the axle rotating about the frame structure 304. The frame structure 304, and particularly the elongated members 304a, include inward hubs 304d for engaging the axle 306. The hubs can be integrally formed with the elongated members or can be separately attached to the members. If the hubs are integral with the elongated members the hubs are preferably solid to ensure that the overall frame structure is air-tight.

Figure 6A:
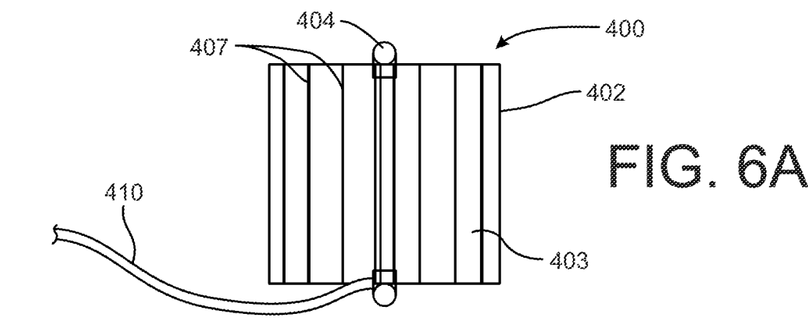
FIGS. 6A-C are top, side and end views of a further embodiment of a floating RCS apparatus according to the present disclosure.
Figure 6B:
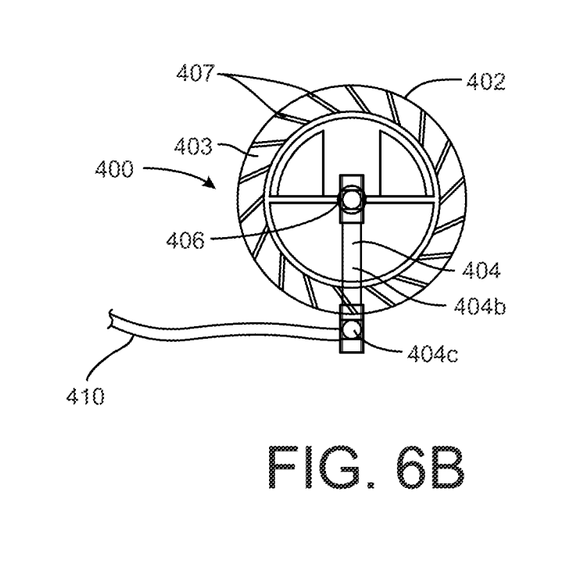
Figure 6C:
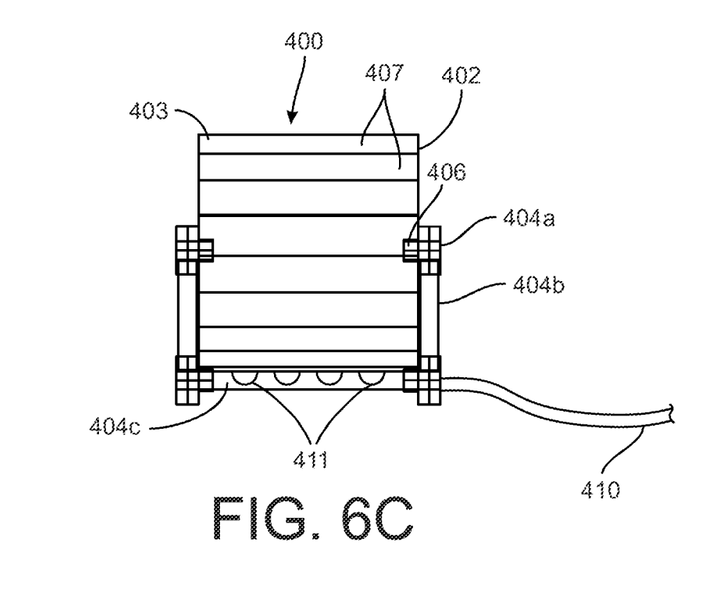
Figure 7:
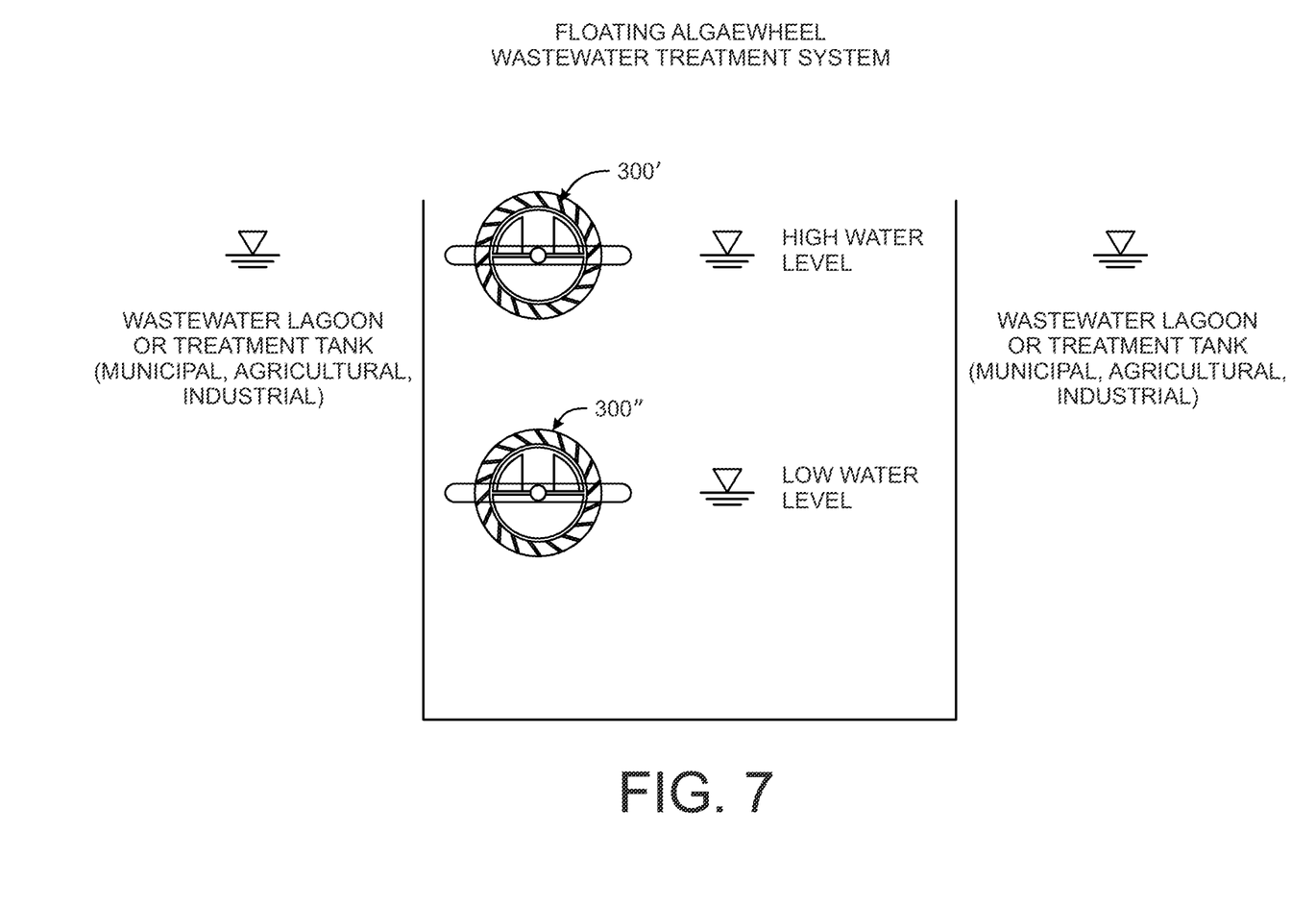
FIG. 7 is a diagram of a floating RBC apparatus as disclosed herein, as used in a wastewater treatment system.
Figure 8:
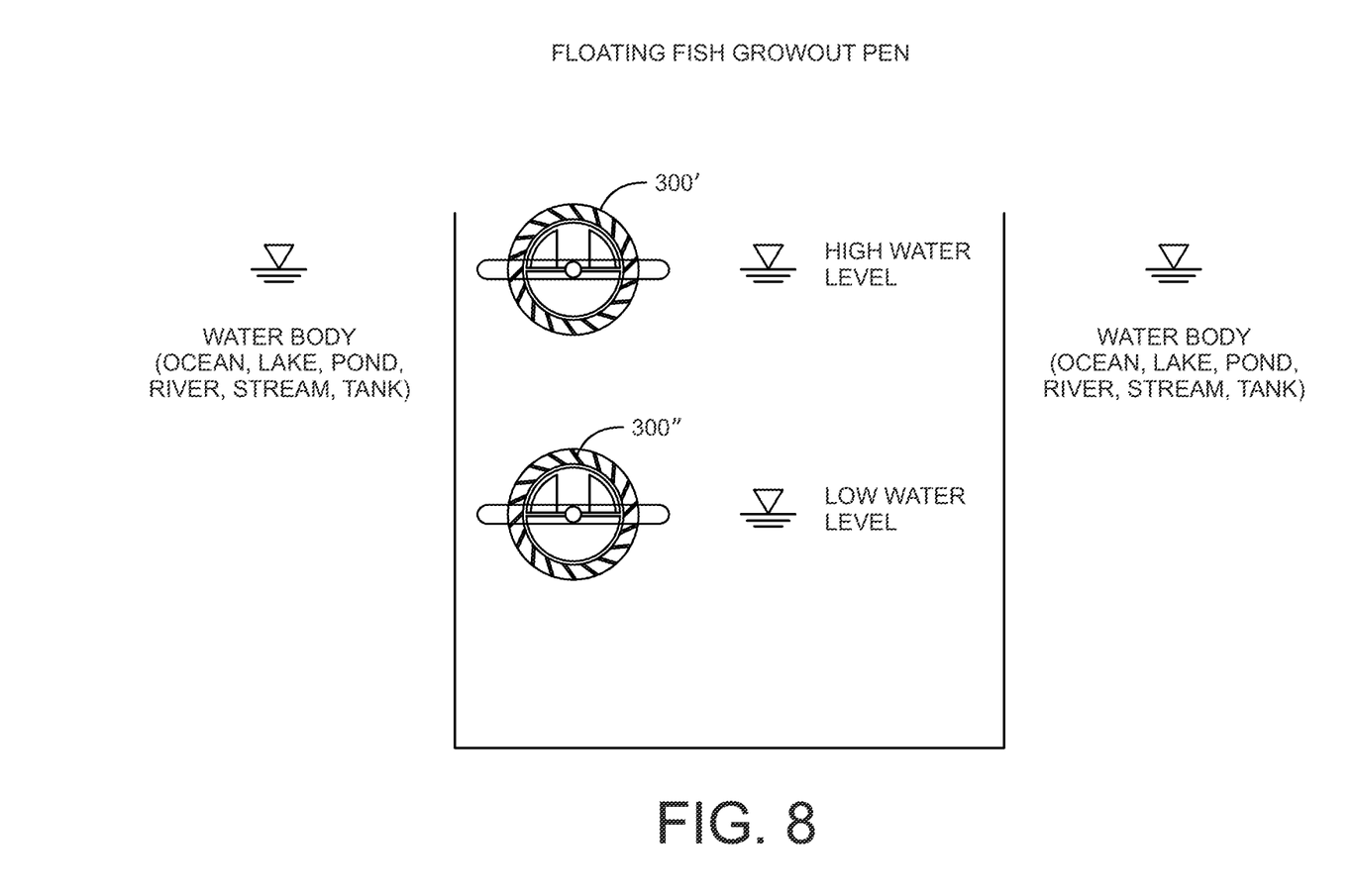
FIG. 8 is a diagram of a floating RBC apparatus as disclosed herein, as used in an aquaculture system or fish grow-out pen.

As shown in FIGS. 7-8, the floating assembly 300 can be disposed within a body of water, whether a wastewater lagoon or a tank, for a wide range of uses—from wastewater treatment (FIG. 6) to a fish grow-out pen (FIG. 7). Since the entire assembly floats, it follows the water level—from the high-water level position 300' to the low-water level position 300". The RBC apparatus carried by the floating frame structure continues to operate under any water level condition. As explained above, the RBC apparatus 302/30 requires air flow against the vanes 307 to rotate the apparatus to alternately expose the vane surfaces to light and water. In the embodiment of FIGS. 4A-C, an air diffuser 310 is positioned below each floating assembly 300 in an operating position so that a flow of air, whether as bubbles or a continuous jet, impinges on the vanes to rotate the apparatus. In this embodiment, the diffuser 310 is connected to an air feed pipe structure 312 that is placed at the bottom of the body of water. In order to ensure that the air diffuser 310 is aligned with the RBC apparatus 302, the floating assembly 300 can be tethered to the pipe structure to ensure that the assembly does not float out of range of the diffuser. It can be appreciated that the tether must accommodate changes in the water level, allowing the assembly to remain floating regardless of water level. The position of the RBC apparatus 302 relative to the air diffuser 310 is optimized so that the air flow upward onto the vanes can rotate the vanes at an optimum speed. Thus, in the illustrated embodiment, the air from the air diffuser impinges on the vanes at a location corresponding to about ½ the radius between the axle 306 and the vanes 307.

Figure 5A:
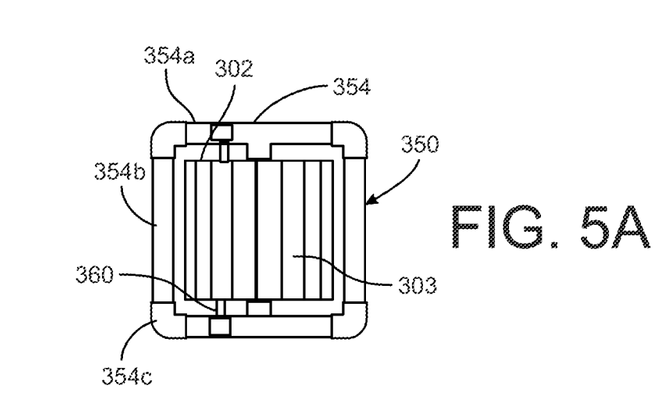
FIGS. 5A-C are top, side and end views of the floating RBC apparatus shown in FIGS. 4A-C, with a second embodiment of an air diffuser.
Figure 5B:
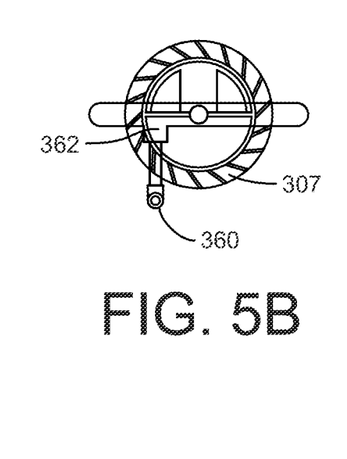
Figure 5C:
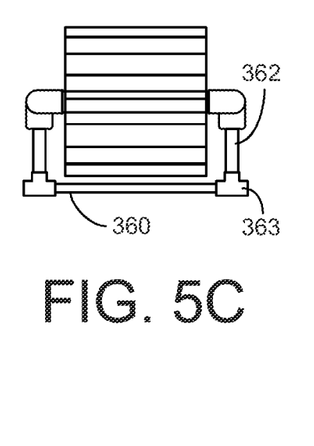

In another embodiment, the air diffuser is incorporated into the floating assembly, as shown in FIGS. 5A-C. The floating assembly 350 includes a frame structure 354 that is similar to the frame structure 304 and is configured to support an RBC apparatus 302. The frame structure 354 includes elongated members 354a, 354b joined at joints 345c, again similar to the frame structure 304. However, in one modification, an air diffuser 360 is carried in its operating position beneath the RBC apparatus by a separate frame structure 362. The separate frame structure 352 is affixed to the elongated members 354a so that the air diffuser 360 can span the frame structure 354 and so that the air diffuser 360 is properly aligned, in its operating position, with the vanes 307 of the RBC apparatus for maximum rotational effect. In particular, the frame structure 352 and air diffuser are submerged below the media wheel 303. The air diffuser 360 is connected to a fitting 363 that is configured to be connected to an air supply, such as through flexible tubing connected to an air manifold associated with the body of water. The air diffuser 360 can be in the form of a hollow tube with apertures spaced along the length of the tube directed toward the RBC apparatus.

It can be appreciated that incorporation of the air diffuser 360 into the floating assembly 350 guarantees proper alignment of the air leaving the diffuser and the vane of the RBC apparatus. Thus, the floating assembly shown in FIGS. 5A-C does not require a tether to maintain the proper positioning of the RBC apparatus. In this embodiment, movement of the floating assembly 350 is essentially only limited by the connection between the fitting 363 of the air diffuser and the air manifold. The air connection or tubing is configured to allow the floating assembly 350 to move between the high and low water level positions 300' and 300", respectively, in FIGS. 7-8. In a further modification, the air manifold system that supplies air to the air diffuser 360 of each assembly within a given body of water can have a particular buoyancy that allows the manifold to reside at a predetermined depth within the body of water, even as the water level rises and falls.

In a further embodiment, shown in FIGS. 6A-C, the assembly 400 is free floating, like the assembly 350. The assembly includes an RBC apparatus 402 that is constructed like the RBC apparatuses 302 and 30, and that is rotationally supported on a frame 404. In particular, the frame 404 includes upper horizontal members 404a that support the axle 406 of the RBC apparatus. The horizontal members are connected to vertical members 404b that extend downward on either side of the RBC apparatus 402 and that are connected to a lower horizontal member 404c. The frame 404 is thus provided in a rectangular form, as shown in FIG. 6C. An air supply tube 410 terminates in a diffuser 411 that is mounted to the lower horizontal member 404c and that is oriented in its operating position beneath the RBC apparatus to direct air upward onto the vanes 407. The air supply tube 410 can be connected to an air pump that is maintained outside the body of water on which the assembly 400 floats (see FIGS. 7-8). It is contemplated that the air supply tube can be integrated into the lower horizontal member 404c, such as in the form of an internal passageway connected to the air supply tube and including openings forming the air diffuser 411.

In one feature of the assembly 400, the lower member 404c does not float and does not have sufficient buoyancy to seek the surface of the body of water. This feature ensures that the air diffuser 411 is maintained directly below the RBC apparatus 402 so that the air bubbling upward from the diffuser will always impinge directly on the vanes 407 to rotate the media wheel 403, as is necessary for the RBC apparatus 402 to operate as described above. The frame, and particularly the horizontal member 404c, can be weighted or can be formed of a material that does not float or that lacks sufficient buoyancy to seek the water surface.

In order for the assembly 400 to float on the surface of the body of water, the media wheel 403 is formed of a buoyant material that is sufficiently buoyant to maintain the media wheel at the surface of the water, as shown in FIG. 7-8, or more particularly to maintain the upper horizontal members 404a of the frame and the axle 406 of the RBC apparatus at the surface. In one specific embodiment, the media wheel is formed of a polypropylene with gas bubbles entrained within the material. The gas bubble density depends on the size of the frame and the weight of the algae growing on the media wheel 403. In one specific embodiment, the gas-entrained polypropylene has a volume ratio of gas bubbles to polypropylene of 20%. In the specific embodiment, the entrained bubbles are formed by intermingling polymer beads with nitrogen filled beads. The co-mingled polymer and gas beads are placed in a mold and heated to melt the polymer material of the polymer beads and the gas beads. The polymer fills the mold while the gas, which can be nitrogen for instance, is released from the gas beads but entrained within the polymer body.

It is contemplated that a given body of water can include many RBC floating assemblies, such as the assemblies 300, 350, 400. The assemblies can float freely within the body of water as long as the assemblies are situated above a corresponding air diffuser. The assembly 300 does not include its own air supply, so some means must be provided to ensure that the assembly is aligned vertically with an air diffuser 310. This can be accomplished by tethering each assembly 300 to a corresponding diffuser. Alternatively, the entire surface of the body of water can be filled with side-by-side assemblies 300, each positioned above an air diffuser. The assemblies 350, 400 include their own air diffuser so a tether or other mechanism for restraining the assembly is not required. In these embodiments, the assemblies 350, 400 can float freely in the body of water, but it is understood that their movement will be restrained by the air supply tube that is connected to the external air pump.

Figure 9:
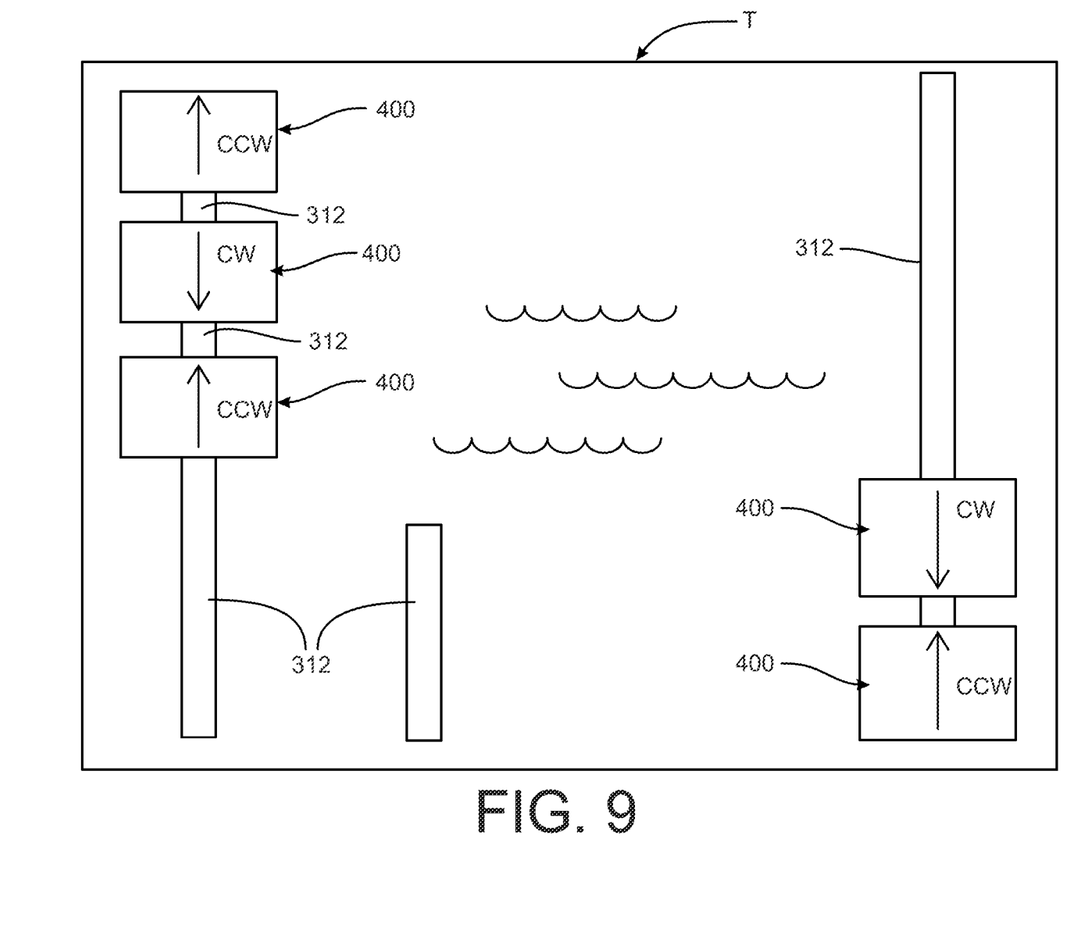
FIG. 9 is a diagram of a tank including multiple floating RBC apparatuses.

In one use, a tank T includes a plurality of RBC floating assemblies 400, as shown in FIG. 9. The assemblies are free-floating within the tank but a sufficient number of assemblies are provided so that the assemblies generally maintain their position within the tank even as they rotate.

A series of air diffusers, such as the diffusers 312 can be arranged at the bottom of the tank to direct air bubbles upward to the assemblies. In accordance with one aspect of the disclosure, the assemblies are packed within the tank T but are arranged so that the media wheels of adjacent assemblies rotate in opposite direction. Thus, the media wheel of the left uppermost assembly rotates in the counter-clockwise (CCW) direction, while the immediately adjacent assembly rotates in the clockwise (CW) direction. Similarly, in the right lowermost assembly 400 rotates in the CCW direction while the immediately adjacent assembly rotates in the CW direction. As appreciated from FIGS. 6A-6C, the media wheel 403 and vanes 407 of the assembly 400 are protected from contact with adjacent assemblies 400 in a direction transverse to or perpendicular to the direction of rotation by the vertical members 404b of the frame 404. However, the wheel and vanes are exposed in the direction of rotation, meaning that there is no frame structure protecting the wheel from contact with adjacent floating assemblies 400. However, it has been found that if the wheels of adjacent floating RBC assemblies rotate in opposite directions the assemblies do not contact each other in the direction of rotation. In one modification the frame 404 of the floating RBC assemblies 400 in the tank T can be eliminated. In this modification, the media wheel 403 is essentially a stand-alone rotating wheel, propelled by air bubbles from the air diffuser 312. As long as the media wheels are arranged in alternating directions of rotation (i.e., CCW-CW-CCW-CW, etc.) the media wheels were continue to rotate and continue to promote algae growth.

It can be appreciated that the floating RBC systems disclosed herein can be added to existing aeration tanks at a wastewater treatment plant without the need to construct new tanks or modify the existing tanks. The air diffusers needed for operation of the RBC apparatus can be the existing aeration features already present in the wastewater treatment protocol.

As noted above, lagoon-type wastewater treatment plants, which use natural ponds rather than tanks, cannot meet the treatment levels required by regulatory agencies. However, for lagoon-type wastewater plants, the floating RBC systems disclosed herein can be added directly into the lagoons. This would allow the existing lagoons to comply with more stringent treatment requirements without having to construct a new mechanical treatment plant.

Existing outdoor aquaculture systems employ net pens to grow fish in ponds, lakes, and offshore facilities. These types of aquaculture systems create and release untreated wastes from the fish which can damage or destroy the surrounding natural ecosystem. The floating RBC systems disclosed herein can be installed within lined aquaculture raceway systems which can trap and treat the fish wastes, eliminating impacts on the surrounding ecosystems.

For existing indoor aquaculture or recirculating aquaculture systems (RAS), the floating RBC systems disclosed herein can be added into the existing fish tanks and the existing aeration system within the fish tanks can serve as the air diffuser to rotate the RBC apparatus. Again, the introduction of the floating RBC system of the present disclosure eliminates the need to construct new aquaculture tanks or modify the existing tanks.

The present disclosure should be considered as illustrative and not restrictive in character. It is understood that only certain embodiments have been presented and that all changes, modifications and further applications that come within the spirit of the disclosure are desired to be protected.

What is claimed is:

1. A rotating biological contactor (RBC), comprising:
a media wheel supported on an axle for rotation about a central axis defined by said axle, said media wheel including;
a plurality of vanes configured for growth of algae thereon, said plurality of vanes oriented and configured to cause said media wheel to rotate when air impinges on said vanes such that when said media wheel is partly immersed in water rotation of the media wheel alternately exposes algae growing on the plurality of vanes to sunlight and to the water; and
a biological filter media contained in one portion of the media wheel, the biological filter media configured to support bacterial growth, wherein rotation of the media wheel alternately immerses the filter media in the water and removes the filter media from the water;
a frame connected to said axle, whereby said media wheel rotates about the central axis relative to said frame; and
an air diffuser connected to a source of air, said air diffuser arranged in an operating position to direct air to impinge on said plurality of vanes when the media wheel is partly immersed in water,
wherein an assembly of said media wheel and said frame connected to said axle is configured to float independently in water, and
wherein one of said media wheel and said frame is constructed with a buoyancy sufficient to support the media wheel partly immersed in water during rotation of the media wheel.

2. The RBC of claim 1, wherein said air diffuser is supported on said frame.

3. The RBC of claim 1, wherein said frame includes a number of air-filled tubes that provide a buoyancy sufficient to support the media wheel partly immersed in water during rotation of the media wheel.

4. The RBC of claim 3, wherein said air diffuser is supported on said frame.

5. The RBC of claim 1, wherein:
said frame includes a rectangular frame sized to receive the media wheel within the rectangular frame; and
said axle is mounted to said rectangular frame to extend across a dimension of said rectangular frame.

6. The RBC of claim 5, wherein said rectangular frame is formed by a number of air-filled tubes that provide a buoyancy sufficient to support the media wheel partly immersed in water during rotation of the media wheel.

7. The RBC of claim 1, wherein:
at least a portion of said media wheel is formed of a material with a buoyancy sufficient to support the media wheel partly immersed in water during rotation of the media wheel; and
said air diffuser is supported on said frame.

8. The RBC of claim 7, wherein said portion of said media wheel is formed of a gas-entrained plastic.

9. The RBC of claim 8, wherein the plastic is polypropylene.

10. The RBC of claim 8, wherein the gas is nitrogen.

11. The RBC of claim 7, wherein said frame includes:
a pair of elongated vertical members, each connected at one end thereof to a corresponding end of said axle; and
an elongated horizontal member spanning between and connected to an end of each vertical member opposite said one end, wherein said air diffuser is supported on said horizontal member and said horizontal member is configured to maintain said air diffuser in said operating position when the media wheel partly immersed in water during rotation of the media wheel.

12. A wastewater treatment facility comprising:
a tank for receiving wastewater;
a plurality of rotating biological contactors (RBCs) according to claim 1 floating in said wastewater; and
an air supply connected to the air diffuser of each of said plurality of RBCs.

13. A water treatment system for a body of water, comprising:
a plurality of rotating biological contactors (RBCs) according to claim 1 floating in the body of water; and
an air supply connected to the air diffuser of each of said plurality of RBCs.

14. A water treatment facility comprising:
a tank containing water;
a plurality of media wheels free floating in the tank, each of said media wheels including a plurality of vanes configured for growth of algae thereon, said plurality of vanes oriented and configured to cause said media wheel to rotate when air impinges on said vanes such that when said media wheel is partly immersed in the water rotation of the media wheel alternately exposes algae growing on the plurality of vanes to sunlight and to the water, wherein at least a portion of said media wheel is formed of a material with a buoyancy sufficient to support the media wheel partly immersed in the water during rotation of the media wheel; and
an air diffuser associated with each of said plurality of media wheels and disposed in said tank to direct air toward each of said plurality of media wheels to impinge on said vanes, said air diffuser connected to an air supply.

15. The water treatment facility of claim 14, wherein said portion of said media wheel is formed of a gas-entrained plastic.

16. The water treatment facility of claim 15, wherein the plastic is polypropylene.

17. The water treatment facility of claim 15, wherein the gas entrained in the plastic is nitrogen.

18. The water treatment facility of claim 14, wherein each of the plurality of media wheels is tethered to the associated air diffuser to maintain the floating position of the associated media wheel relative to the associated air diffuser.

* * * * *